United States Patent [19]

Bartlett

[11] 4,055,793
[45] Oct. 25, 1977

[54] ELECTRICAL LOAD CONTROLLER

[75] Inventor: Peter G. Bartlett, Davenport, Iowa

[73] Assignee: Automation Systems, Inc., Eledridge, Iowa

[21] Appl. No.: 703,398

[22] Filed: July 8, 1976

[51] Int. Cl.² ............................................. G05F 3/04
[52] U.S. Cl. ............................ 323/22 SC; 323/22 T; 323/24; 323/38
[58] Field of Search ..................... 307/252 B; 321/2; 323/19, 22 SC, 22 T, 24, 38; 331/112, 113 A

[56] References Cited

U.S. PATENT DOCUMENTS

| | | | |
|---|---|---|---|
| 3,012,237 | 12/1961 | McCoy | 331/112 X |
| 3,013,219 | 12/1961 | Fischman | 331/112 |
| 3,445,783 | 5/1969 | Roos et al. | 331/112 X |
| 3,467,852 | 9/1969 | Murray et al. | 331/113 A |
| 3,501,752 | 3/1970 | Thornwall | 331/112 X |

OTHER PUBLICATIONS

GE SCR Manual, 3rd Edition, 1964, pp. 69, 70.

*Primary Examiner*—A. D. Pellinen
*Attorney, Agent, or Firm*—Woodard, Weikart, Emhardt & Naughton

[57] ABSTRACT

An electrical load in series with a source of AC power is connected across the anodes of a triac with the secondary of a transformer being connected between the triac gate and one of the triac anodes. An electronic switch controls current flow in the primary of the transformer such that a negative voltage is supplied at the gate of the triac during conduction by the primary until saturation of the transformer occurs. After saturation, the electronic switch opens the transformer primary initiating a flyback period during which the triac gate potential rings positive and a consistent peak positive current is supplied to the triac gate from the secondary of the transformer. A half-wave rectifier circuit and transistor may be substituted for the triac for DC load control, or a pair of these transistor circuits may be connected in series to provide AC load control.

8 Claims, 3 Drawing Figures

ELECTRICAL LOAD CONTROLLER

BACKGROUND OF THE INVENTION

1. Field of the Invention

The invention is in the field of electrical load control circuits.

2. Description of the Prior Art

In the past, various schemes have been employed for gating triacs for AC load control. For example, a small resistance and a switch have been connected between the first anode of the triac and its gate. The switch may be a reed relay or light-sensitive switch. When an appropriate control signal is applied to the switch, the switch closes and current coupled through the resistance from the first anode is supplied to the gate, turning on the triac. With this type of circuit, when the triac is nonconductive, the gate is left open and high leakage currents or irregularities of line voltage can trigger the triac spontaneously.

It has not been appreciated, so far as the inventor is aware, in the prior art to utilize a continuous transformer gate-actuation circuit for a triac in a load control wherein the appropriate polarity of transformer secondary connection to the triac gate has been observed.

SUMMARY OF THE INVENTION

An electrical load control comprising a triac operable to have an electrical load in series with a source of electrical energy coupled across its anodes and having a gate, a saturable transformer having a secondary winding, a first end of which is coupled to the triac gate and a second end of which is coupled to an anode of the triac, and having a primary winding and electronic switch means for coupling, in a first condition, electrical current through the primary winding until the transformer is saturated and for essentially removing current from the primary winding after saturation during a flyback period, until the transformer returns to said first condition, said switch means directing current such that the first end of the secondary winding is at a negative potential relative to the second end during conduction by the primary winding and at a positive potential relative to the second end when the primary winding is essentially non-conducting during said flyback period.

It is an object of the present invention to provide a load controller utilizing a triac which receives a positive gating current from the secondary of the transformer with the peak value of the current being consistent regardless of supply variations.

It is a further object of the present invention to provide such a load controller wherein, through a relatively simple exchange of components, an AC or DC load control may be provided utilizing a transistor in place of the triac.

Further objects and advantages of the present invention shall be apparent from the following detailed description and accompanying figures.

DESCRIPTION OF THE PREFERRED EMBODIMENT

Figure 1:
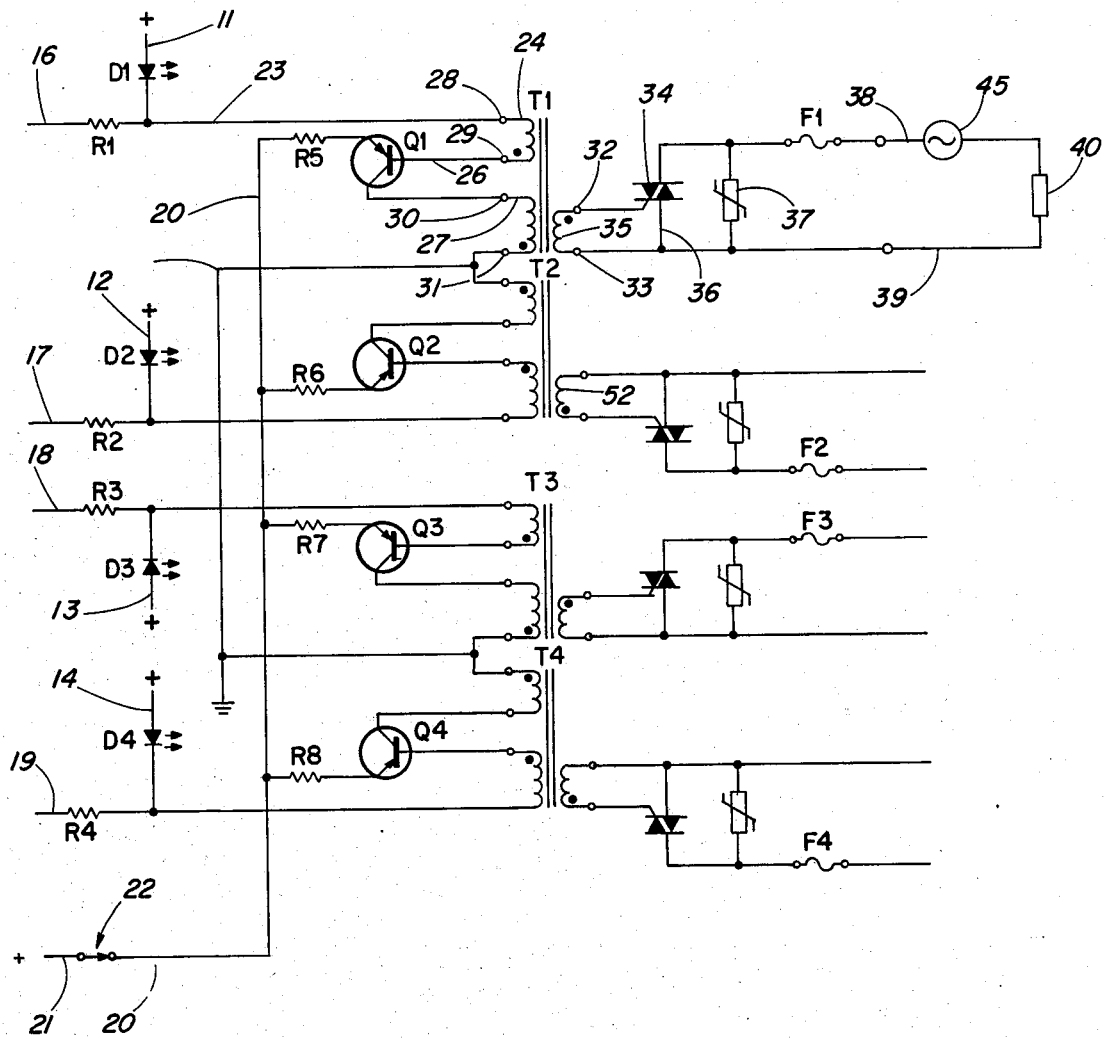
FIG. 1 is a schematic diagram of a load controller according to the present invention, including four load control output circuits, one of which is shown connected to a source of power and a load.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to FIG. 1, there is shown an output circuit for a load controller according to the present invention. A B+ voltage is supplied on lines 11, 12, 13 and 14 to light-emitting diodes D1, D2, D3 and D4, respectively, at their anodes. Lines 16, 17, 18 and 19 are coupled through resistors R1 through R4, respectively, to the cathodes of the four light-emitting diodes. The lines 16 through 19 are coupled to a load switching signal source such as output pins of a CMOS chip.

For example, if the load associated with LED D1 is to be energized, a logic zero (low) is applied at line 16 and current flows from B+ through D1, R1 and line 16. R1, for example, may be a 1K resistor, with the value of R1 being determinative of the brightness of D1. When the load associated with D1 is energized, as shall be discussed hereinafter, D1 will be illuminated, indicating the state of the command at line 16 from the logic circuitry or other load selector means.

B+ is also applied on a line such as 21 coupled through a switch 22 to line 20. Switch 22 is typically an electronic switch such as a transistor network but could also be a mechanical switch. This switch 22 determines whether the electrical loads associated with transistors Q1 through Q4 will be operable to be controlled by the selector signals applied to lines 16 through 19. With switch 22 closed, line 20 is at B+ potential, which applies B+ to the emitters of transistors Q1 through Q4 through resistors R5 through R8. As each transistor such as Q1, and its associated circuitry such as R1, D1 and R5, operates in a similar fashion, only the operation of Q1 shall be described in detail.

When line 16 goes low, a voltage approximately .7 volts less than B+ (due to the drop across D1) is applied through line 23, winding 24 of transformer T1 and line 26 to the base of Q1. Q1 is turned on (its emitter being at B+) with current flowing from line 20 through R5 and from the emitter to the collector of Q1 and through winding 27 of transformer T1. There is positive feedback from the collector winding 27 to the base winding 24. Pins 28 and 30 of the transformer go high and pin 29 goes low. This relationship causes Q1 to saturate. Pin 31 of the transformer is grounded as shown. The current rise in windings 24 and 27 continues until the transformer saturates, killing the positive feedback which had maintained A1 in an "on" condition. Whereupon the magnetic field collapses and there follows a flyback period in which current flows in secondary winding 35 and in which the primary voltages ring to opposite polarities.

During the period of conduction of Q1, transformer secondary pin 32 is negative. The gate of triac 34 in the negative direction presents a higher impedance but requires less current for gating than in the forward direction. The triac gate is effectively a good diode in the forward direction and a high impedance diode in the reverse direction. During flyback, the triac gate receives positive voltage from pin 32 of the transformer and presents a lower impedance which requires more current to assure continued triggering of the triac. The amount of peak current available to gate triac 34 in the positive direction during the flyback period is essentially the same from cycle to cycle, being determined by the transformer reaching saturation rather than the particular voltage level of the B+ supply. In this manner the peak current level for forward gating of the triac is independent of B+ levels. With the transformer winding polarities as shown in FIG. 1, with the negative voltage applied to the gate of triac 34 during the period of conduction of Q1, the gating current is less critical since, as stated above, less current is required to gate the triac. During flyback, with the polarities of transformer winding shown, a positive voltage is applied to the gate of triac 34, and this voltage reaches the necessary level for gating the triac consistently even though in this positive condition more current is necessary for triggering.

The presently-disclosed circuit is operable for B+ voltages from about 4 to about 18 volts. The saturation current for each transformer is determined by the values of R5 through R8 respectively. An exemplary value for R5 through R8 is 22 ohms. Transformers T1 through T4 are nominally 8 to 12 volt blocking oscillator transformers, with a nominal 1 microsecond pulse width, secondary and feedback windings (24 and 25) one third primary (27) and have ferrite high permeability cores. Transistors Q1 through Q4 should be good quality switching transistors with a saturation current of at least 50 milliamperes and able to handle a flyback voltage in the order of twice B+. The triacs such as 34 utilized are not critical and might be of the range from 16 amp down to one half amp load current.

In parallel with the first and second anode connections of triac 34 is a metal oxide varistor 37 for clipping excess voltages from the line. Varistor 37 has a certain amount of capacitance and reduces the rise time of returning spikes on the power lines 38 and 39, which are coupled to an electrical load 40 to be controlled which is in series with a source of power 45 such as 120 volt 60 cycle AC. Varistor 37 reduces the possibilities of triggering the triac with high dv/dt spikes when triac 34 is not gated. In addition, the transformer T1 secondary presents a low output impedance and any voltage spikes coupled (due to interelectrode capacitance) through triac 34 to its gate are presented with the low impedance between pins 32 and 33. The transformer connection from gate to second anode (via line 36) of triac 34 additionally shorts triac resistive leakage current, permitting operation of the triac at higher temperatures without the risk of leakage current generating a gate to second anode voltage that would turn on the triac in the absence of a gating potential.

Figure 2:
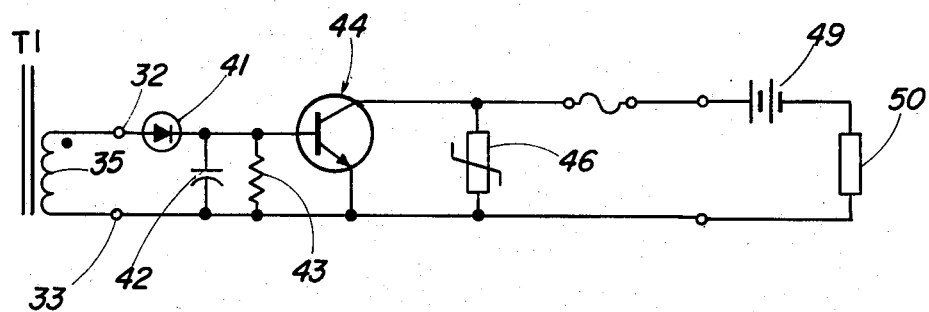
FIG. 2 is a modification of one output circuit of FIG. 1 utilizing a half wave rectifier and a transistor for DC load control.

Referring now to FIG. 2, the output winding 35 of transformer T1 is shown connected to a DC load circuit. The primary side of the transformer circuitry remains the same as shown in FIG. 1. The polarity of winding 35 remains the same, with the positive pulse being produced at pin 32 during the flyback period so that a consistent peak current is provided at the transformer output on each flyback cycle. Current through diode 41 charges capacitor 42 on each flyback cycle. This maintains independence from exact values of supply voltages. Capacitor 42 should be large enough to maintain the voltage level between flyback pulses and may be, for example, 0.001 microfarads. Resistor 42 may be in the range between 1 and 10 K ohms with an exemplary value of 4.7 K ohms. A transistor 44 having a turn-on voltage drop, base to emitter, in the order of 0.7 volts or a Darlington transistor at 1.4 volts-on, may be utilized. Varistor 46 is chosen to clip voltage spikes below the transistor breakdown voltage level. A DC voltage source 49 is connected in series with load 50 across the output of transistor 44 as shown.

Figure 3:
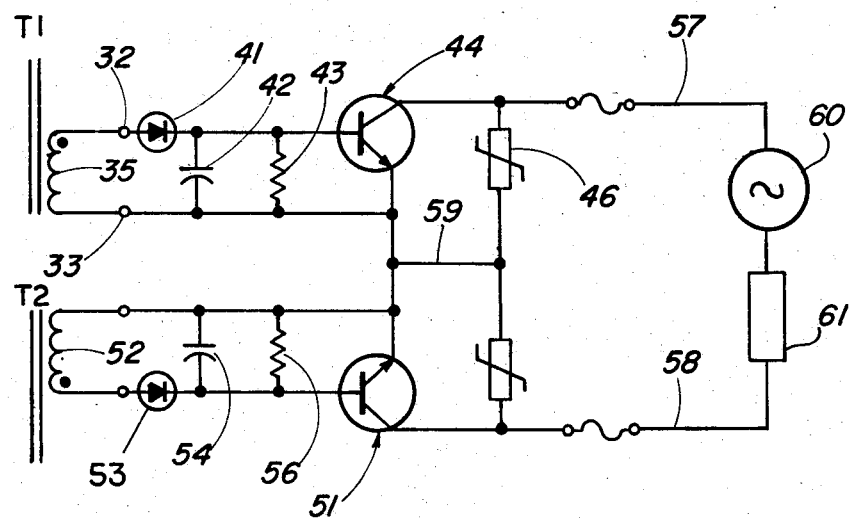
FIG. 3 is a combination of two output circuits from FIG. 1, each of which is modified according to FIG. 2 and wherein the transistor emitters are connected together.

As shown in FIG. 3, a pair of transistors 44 and 51 from different transformers T1 and T2 may be utilized for AC load control rather than a triac. Secondary winding 52, when activated by the primary, turns on transistor 51 through diode 53 with capacitor 54 and resistor 56 operating in the same fashion as capacitor 42 and resistor 43 associated with winding 35, described above. Line 57 is coupled through an AC power supply 60 and load 61 back to line 58 to complete the AC load circuit. As shown, the emitters of the transistors 44 and 51 are tied together and to the common connection between the two varistors by line 59.

As can be seen, the same basic load control circuitry can be adapted to control AC or DC loads with the variation of load control transistor/triac and addition of diode, capacitor and resistor (such as 41, 42 and 43) or their omission. If diode 41 is not used, it is replaced by a short, and the emitters of the transistors must be shorted together for operation as shown in FIG. 3. Transformers T1 and T2 and conveniently in the same package with a common grounding lead.

While there have been described above the principles of this invention is connection with specific apparatus, it is to be clearly understood that this description is made only by way of example and not as a limitation in the scope of the invention.

What is claimed is:

1. An electrical load control comprising:
   a triac having a first and second anode and operable to have an electrical load in series with a source of electrical energy coupled across its anodes and having a gate which presents a low impedance to said first anode with a first polarity signal and which presents a high impedance to said first anode with an opposite polarity signal;
   a saturable transformer having a secondary winding, a first end of which is coupled to the triac gate and a second end of which is coupled to said first anode of the triac, and having a primary winding; and
   electronic switch means for coupling, in a first condition, electrical current through the primary winding until the transformer is saturated and for essentially removing current from the primary winding after saturation during a flyback period, until the transformer returns to said first condition, said switch means directing current such that said gate presents a high impedance to said first anode during conduction by the primary winding and said gate presents a low impedance to said first anode when the primary winding is essentially non-conducting during said flyback period.

2. The control of claim 1 in which the transformer includes a first primary winding and a second primary winding, and the electronic switch means comprises a transistor whose base is coupled to the dotted end of the first primary winding with the second end of the first primary winding being coupled from a source of positive potential, the emitter and collector of the transistor being operable to couple a positive potential through the transistor to the undotted second end of the second primary winding with the dotted first end of the second primary winding being coupled to ground, the dotted end of the secondary winding being coupled to the triac gate.

3. The control of claim 2 in which the transistor is a pnp transistor with its emitter coupled to a source of positive potential and its collector coupled to the undotted second end of the second primary winding.

4. The control of claim 1 in which said electronic switch means comprises a transistor and a resistor connected to the emitter of said transistor.

5. The control of claim 1 in which said first end of said secondary winding connects directly to the triac gate and said second end of said secondary winding connects directly to said first anode.

6. An electrical load control comprising:
a transistor operable to have an electrical load in series with a source of electrical energy coupled across its emitter and collector;
a saturable transformer having a secondary winding, a first end of which is coupled to the base of the transistor and a second end of which is coupled to one of the other two transistor terminals, and having a primary winding;
electronic switch means for coupling, in a first condition, electrical current through the primary winding until the transformer is saturated and for essentially removing current from the primary winding after saturation during a flyback period, until the transformer returns to said first condition, said electronic switch means functioning as a free-running blocking oscillator; and
rectifier means for rectifying and maintaining the potential generated during the flyback at the transformer secondary and for coupling this rectified potential to the base of the transistor.

7. A first control and a second control, each according to claim 6, wherein one terminal other than the base of the transistor of the first control is coupled to a terminal other than the base of the transistor in the second control and wherein an electrical load in series with a source of electrical energy is operable to be coupled across the other two non-base terminals of the transistors, the connection between the transistors being such that the direction of normal current flow through each transistor is into the common coupling connection.

8. The control of claim 7 in which the transistors are npn transistors and the emitters of the transistors are coupled together with the electrical load coupled across the transistor collectors.

* * * * *